March 26, 1957   E. F. MORRILL, JR   2,786,489
PIPE LINE PLUGS
Filed Sept. 16, 1954   5 Sheets-Sheet 1

INVENTOR.
Edward Francis Morrill, Jr.
BY
ATTORNEYS

March 26, 1957     E. F. MORRILL, JR     2,786,489

PIPE LINE PLUGS

Filed Sept. 16, 1954     5 Sheets-Sheet 2

Fig.2

INVENTOR.
Edward Francis Morrill, Jr.

BY

*Ashley & Ashley*

ATTORNEYS

March 26, 1957 E. F. MORRILL, JR 2,786,489
PIPE LINE PLUGS
Filed Sept. 16, 1954 5 Sheets-Sheet 4

INVENTOR.
Edward Francis Morrill, Jr.
BY
Ashley & Ashley
ATTORNEYS

March 26, 1957 E. F. MORRILL, JR 2,786,489
PIPE LINE PLUGS

Filed Sept. 16, 1954 5 Sheets-Sheet 5

INVENTOR.
Edward Francis Morrill, Jr.
BY
ATTORNEYS

United States Patent Office 2,786,489
Patented Mar. 26, 1957

2,786,489

PIPE LINE PLUGS

Edward Francis Morrill, Jr., Longview, Tex., assignor to Mid-Valley Pipeline Company, Longview, Tex., a corporation of Ohio Application September 16, 1954, Serial No. 456,517

17 Claims. (Cl. 138—89)

This invention relates to new and useful improvements and methods and means for plugging pipe lines at selected points.

There have come into use many fluid transmission pipe lines through which fluids such as crude oil, lubricating oil, natural gas, and gasoline, and other marketable gases and liquids are flowed for transportation from one area to another. Many of these transmission lines or pipe lines are of considerable length, and it is quite customary for a pipe line to extend several hundred miles or more for the transportation of fluids between various geographic localities.

It is also customary for such pipe lines to be of considerable diameter or of such size that their cross-sectional areas are measurable in square feet rather than in square inches. Obviously, fittings, such as valves, for such large diameter pipe lines are quite expensive, and a length of ten miles of pipe line or fifty miles of pipe line will contain an enormous quantity of fluid when the pipe line is full and operating.

Due to the quite considerable cost of large diameter valves, pipe lines are not equipped with shut off valves every mile or so, and it is quite usual for a pipe line to contain no valve or other shut off means for a distance of fifty or seventy-five miles or more. Hence, in the event of damage to a pipe line or an arising need for modification or structural change to a pipe line at a given point, a very serious problem arises as to the manner in which the flow of fluid through the pipe line is to be controlled during repair or alteration.

Assuming an average installation in which a pipe line of twenty-four inch diameter pipe is devoid of valves for a distance of fifty miles, and assuming that a break occurs at the center of this section or a need arises for modifying the pipe line at that point, such as installing an additional pumping station, it would be completely infeasible to use the existing valves for isolating that section of the pipe line due to the tremendous quantity of liquid therein. Assuming the pipe line to be full of crude petroleum, the least valuable liquid likely to be passing through the pipe line, there would still be a body of liquid of tremendous value contained within such a section of pipe, and the economic loss of discarding this liquid could not be tolerated even if a point of disposal could be found. Draining of this section of pipe into tanks, tank cars, or tank trucks, would be quite expensive; and probably quite impractical. Hence, repair or modification of the pipe line under these conditions, while not impossible, would be a lengthy and costly operation.

In view of the foregoing, it is the principal object of this invention to provide an improved pipe line plug adapted to be transported through a pipe line to a desired point and there expanded in order to close off the pipe line as desired.

A particular object of the invention is to provide an improved pipe line plugging device which may be introduced into a pipe line and passed therethrough or therein to desired points, at which points the plug may be selectively expanded and contracted so as to withstand pressure differentials acting from either end of the plug, and so as to provide a complete seal or seals at any selected point or points in the pipe line, the plugging device being releasable after use for further passage through the pipe line to a point of removal therefrom.

Still another object of the invention is to provide an improved pipe line plugging device which may be introduced into a pipe line at a point remote from the desired point of plugging, transported through the pipe line to the selected point, there expanded into sealing condition, and subsequently released and transported through the pipe line to a point remote from the point of plugging, with provision for removal of the plugging device at the latter remote point.

Yet another object of the invention is to provide an improved method and means of the character described, wherein small diameter openings may be cut into a pipe line for introduction thereinto of means for blocking the passage through the pipe line of a pipe plugging device, as well as means for selectively expanding and contracting the pipe plugging device within the pipe line.

An important object of the invention is to provide an improved method for plugging pipe lines at selected points wherein a plugging device is introduced into a pipe line and transported therein to the selected point, and is there expanded to form a plug through the wall of the pipe through a relatively small diameter opening, the plugging device subsequently being released or contracted and further transported through the pipe line for removal therefrom.

A particular object of the invention is to provide a device of the character described having pressure relieving means for limiting the pressure differential across the plugging device, thereby protecting the device against excessive differentials; and wherein such pressure relieving means is rendered inoperative and incapable of opening under pressure differential when the pipe plugging device is expanded into sealing position.

A construction designed to carry out the invention will be hereinafter described together with other features of the invention.

The invention will be more readily understood from a reading of the following specification and by reference to the accompanying drawings, wherein an example of the invention is shown, and wherein.

Referring now to the drawings in which a specific embodiment of the invention is shown, it is to be noted that a gas or liquid transmission pipe line is normally a one-way system in that fluid is normally transported therethrough in one direction only. Customarily, pumping stations are provided at intervals in the pipe line, the closeness of the pumping station spacing being dependent upon the fluids being handled, the size and nature of the pipe line as well as the terrain it traverses, the pressure drops encountered, the volumes being handled, and so forth. To a considerable extent, all of the pipe line equipment and appurtenances are concentrated at the pumping stations. Between pumping stations, the pipe line consists almost exclusively of a number of miles of pipe buried in the ground and having shut off valves at very rare intervals.

The present invention contemplates the introduction and removal of plugging devices into the pipe line, and the means for such introduction and removal will normally be located at each of the pumping stations. It is the present practice to send scrapers and other devices through a pipe line and hence, the means for introducing and removing a closure plug into and from the pipe line already exists in most instances.

Figure 8:
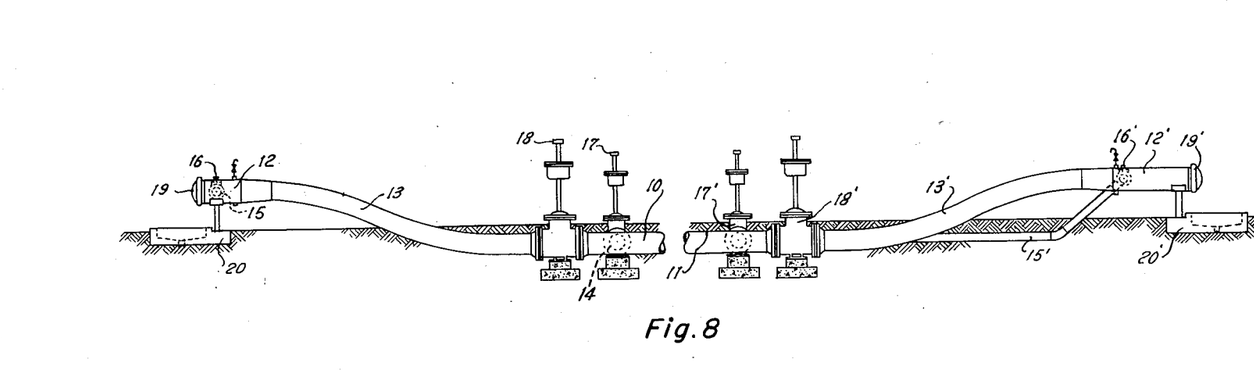
Fig. 8 is a schematic view illustrating the means for introducing the pipe plugging device into a pipe line and removing the same therefrom.
Figure 9:
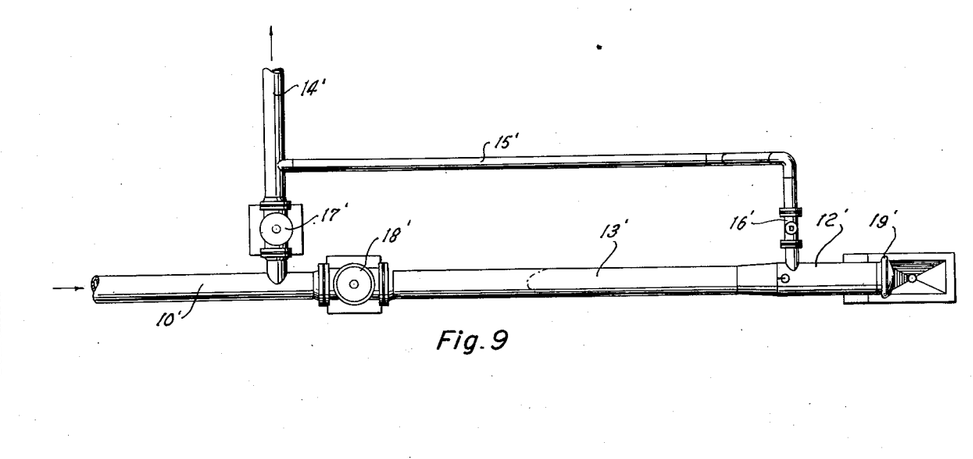
Fig. 9 is a plan view of the pipe plug receiving station illustrated in Fig. 8.

In Figs. 8 and 9, a typical installation is shown of the sending and receiving traps for inserting into a pipe line a scraper or "pig," or the sealing device of this invention, as well as for removing the same from the pipe line. Generally, the bulk of the pipe line 10 is buried under ground, as shown at 11, and the scraper or plug traps 12 are elevated above ground level and connected into the pipe line 10 through gently curving sections 13 which merge into the pipe line 10 without the presence of any sharp turns or corners. Obviously, this is done so that the plug or scraper may move smoothly into the pipe line proper without likelihood of becoming lodged upon obstructions or sharp turns in the entrant section. The fluid or liquid under pressure being pumped into the pipe line from the pumping station (not shown) enters the pipe line 10 through a branch or lateral conductor 14 of similar size, and there is provided a branch or bypass conductor 15 extending between the conductor 14 and the trap 12. The bypass conductor 15 carries a plug or shut off valve 16, full opening line valves 17 and 18 are provided respectively between the conductor 15, downstream of the bypass conductor 15 and the pipe line 10, and the trap 12 and the said pipe line 10.

The trap 12 has its open end closed by a readily removable cover plate or cap 19 which may be removed to expose the open end of the trap for insertion of the plugging device thereinto. Then, upon replacement of the cap 19, the opening of the valves 18 and 16 and the closing of the valve 17, liquid under pressure is forced from the conductor 14 through the bypass conductor 15 and into the trap 12. The fluid thus picks up the plugging device and flows it under pressure through the section 13 and the valve 18 into the pipe line 10, after which the valve 17 may be opened and the valves 16 and 18 closed. Thus, the plugging device is introduced into the pipe line and is driven along therethrough with the liquid being pumped through the pipe line.

Subsequently, after the plugging device has performed its function and it is desired to remove the same from the pipe line, its passage through the pipe line under the impetus of the flowing liquid is continued until the plugging device reaches the receiving trap of a pumping station such trap being shown in the right hand portion of Fig. 8.

The receiving trap is approximately a mirror image of the sending trap and includes the trap 12', the gently curving entrance section 13', the valves 16', 17' and 18', as well as the cap member 19', and the bypass conductor 15'. Normally, the sending and receiving traps differ only in that the bypass conductor 15 of the sending trap is connected into the trap adjacent the cover member 19, while the bypass conductor 15' of the receiving trap is connected into the trap near its point of merging into the entrant section 13'.

Prior to the time the plugging device reaches the receiving trap (and this may be calculated due to the known volume of flow through the pipe line) the valves 18' and 16' are opened, and the valve 17' is closed. Thus, the plugging device is caused to pass into the trap 12' while the liquid is bypassed from behind the plugging device through the bypass conductor 15' into the pipe 14' for passage to the pumping station or other installation present at the locality. After the catching of the plugging device in the trap, the valve 17' may be opened and the valves 16' and 18' closed to restore completely normal operation. Upon opening of the cover 19' and the draining of liquid from the trap into the sump 20', the plugging device may readily be removed.

The means for inserting and removing plugging devices from the pipe lines has been described prior to description of the device itself in order to make provision for a clearer explanation of the operation of the plugging device.

Assuming that the sending and receiving traps of Fig. 8 are located at two consecutive pumping stations in a pipe line, that such pumping stations are spaced apart a distance of seventy-five miles, and that no other line valves are present in the pipe line 10 between these pumping stations, it is apparent that no control of the liquid flow through the pipe line at points between the pumping stations is possible. Assuming further that it is desirable to install an additional pumping station midway between the first two stations in order to provide a thirty-seven and a half mile spacing between stations, it becomes necessary to cut into the pipe line at this midpoint and to make numerous modifications for connection of the pumping station into the pipe line. In this eventuality, the plugging device of the present invention is introduced into the pipe line through the sending trap and is pumped therethrough with the liquid normally flowing through the pipe line until it reaches the point at which plugging or closing off of the pipe line is desired.

Figure 2:
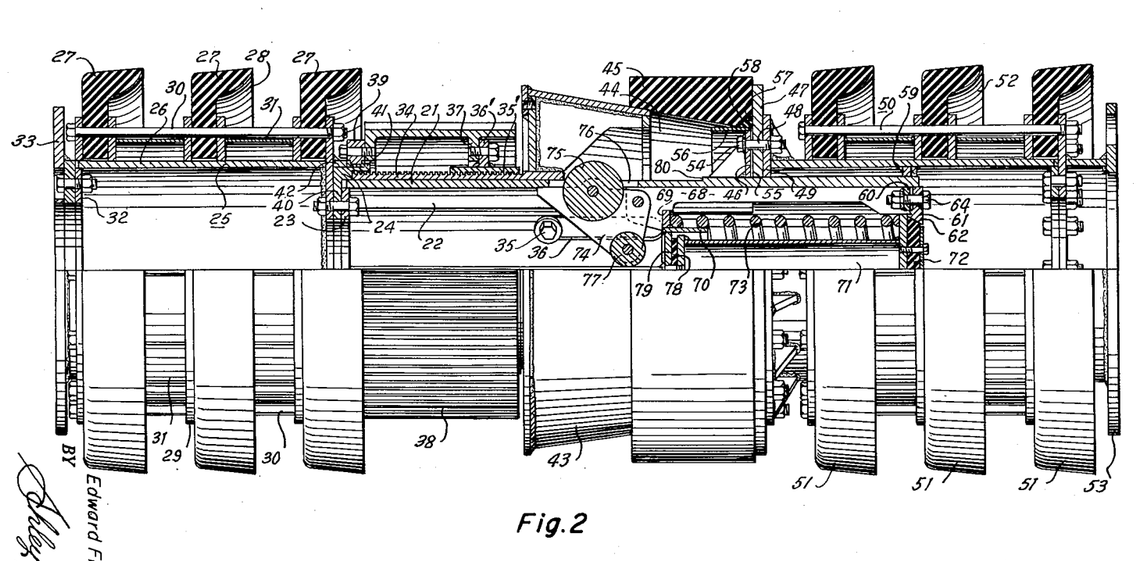
Fig. 2 is an enlarged longitudinal view, partly in elevation and partly in section, of a plugging device constructed in accordance with this invention and showing the device in an unexpanded position.
Figure 3:
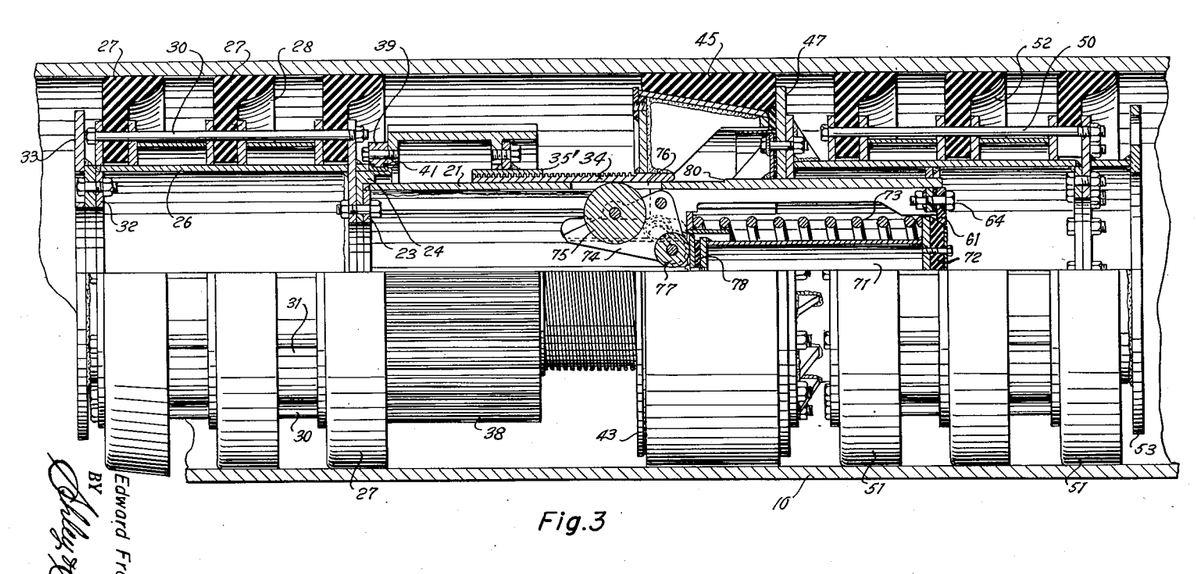
Fig. 3 is a view similar to Fig. 2 showing the device within a pipe line and expanded into sealing position therein.

While various types of plugging devices may be passed through a pipe line in this manner, there is shown in Figs. 2 and 3 a particular embodiment of a plugging device which has been found highly effective. The device, which will be referred to as a plug, includes an elongate tubular core 21 having internal, longitudinal stiffening ribs 22. The mandrel 21 is open at each end and is of somewhat less diameter than the pipe line 10 within which the plug is received. While the plug will travel in either direction in a pipe line under the influence of a sufficient pressure differential, and while it will seal against a pressure acting from either end of the plug, in normal operation the plug travels to the left, as viewed in Fig. 2, and hence, the left hand end of the plug will be referred to herein as the front end of the plug, while the right hand end will be referred to as the rear or trailing end. The front end of the mandrel 21 carries an internal annular flange 23 to which there is bolted a bearing collar 24 and a tubular cup assembly 25.

The cup assembly 25 comprises essentially an internal sleeve 26 having on its outer periphery a series of spaced resilient cups 27, formed of rubber or some other suitable material and provided with pressure sealing lips 28 facing toward the rearward end of the plug. The cups 27 are of such diameter as to fit snugly within the inner-diameter of the pipe line 10, and are held upon the sleeve 26 between annular rings 29 through which elongate securing bolts 30 extend and between which spacer sleeves 31 are positioned. The forward end of the sleeve 26 carries an internal annular flange 32 to which a striker plate 33 is bolted. Removal of the plate 33 permits access to the bolts 30 and complete disassembly of the cup section 25.

An externally threaded sleeve 34 is slidably received upon the forward section of the mandrel 21 and has bolts 35 projecting inwardly from its rearward, unthreaded section through longitudinal slots 36 cut in the wall of the mandrel 21. The slots extend parallel to the longitudinal axis of the mandrel and thus permit longitudinal movement of the sleeve 34 upon the mandrel while preventing relative rotation between the two elements.

For effecting longitudinal movement of the sleeve 34, an internally screw-threaded collar 35' is threaded thereon, the collar having an outwardly projecting annular flange 36' to which is bolted the internal flange 37 of a wide, annular gear 38. The collar 35' is positioned within the rearward portion of the gear 38 to provide support therefor, and an annular bearing ring 39 is secured to the forward end of the gear and engages the bearing collar 24. As shown in Fig. 2, the collar 24 has an annular internal flange 40 by which it is bolted to the flange 23, is counterbored to receive the forward end of the sleeve 34, and is provided with an annular external lip 41 at its rearward extremity against which the ring 39 abuts and which prevents rearward movement of the gear 38 with respect to the mandrel 21. A spacer ring 42, secured to the cup assembly 25, projects rearwardly around the bearing collar 24 and engages the bearing ring 39 to prevent forward movement of the gear 38.

As will appear more fully hereafter, means is provided for engaging the gear 38 and rotating the same upon the mandrel 21, thereby forcing the sleeve 34 to move rearwardly over the mandrel.

A conical wedge or expander drum 43 surrounds and is secured to the rearward portion of the sleeve 34, the smaller end of the drum facing rearwardly of the plug and engaging in the forward portion of the conical bore 44 of an annular sealing or packing rubber 45. A gusset reinforced flange 46 is welded or otherwise affixed upon the mandrel 21 adjacent the rearward face of the rubber 45 and has clamped thereto an annular rubber backing ring 47 by means of bolts 48 which extend through the flange 46 and the ring, and which urge against the ring the annular mounting plate 49 of a rearward cup section 50. The outer periphery of the ring 47 is spaced relatively closely to the inside wall of the pipe line 10, and the ring abuts the base or rearward face of the rubber 45 to prevent rearward movement thereof as the drum 43 moves rearwardly within the rubber to expand the same. Thus, the rubber may be forced outwardly into tight sealing engagement with the inner wall of the pipe 10 to provide an efficient and certain closure of the pipe line.

The structure of the rearward cup section 50 is basically the same as that of the forward cup section 25 and will not be described in detail. The cup section 50 includes a plurality of sealing cups 51, substantially identical to the cups 27 and having rearwardly-facing sealing lips 52 which are adapted to engage the inner wall of the pipe line as the plug passes therethrough. It is through these cups 51 and 27 that the pressure of the liquid flowing through the pipe line is caused to drive the plug through the pipe line to the desired location. Like the forward cup section 25, the rearward cup section 50 has a striker plate 53 provided at its rearward extremity, and is generally tubular in nature in order that fluid may pass readily through the center thereof.

In order to prevent the leakage of fluid through and around the packing rubber 45, the heads 54 of the bolts 48 are desirably welded to the flange 46, and in addition, a sealing gasket 55 is positioned between the flange 46 and the ring 47. Further, a short cylindrical sleeve 56 encompasses the outer periphery of the flange 46 and projects from the ring 47 forwardly into the tapered or conical bore 44 of the rubber 45. An auxiliary sealing ring 57 of right triangular cross-section fits snugly around the outer periphery of the sleeve 56 and abuts the ring 47. The rubber 45 has its rearward inner corner chamfered at 58 to provide space for the mounting of the ring 57. Thus, when the rubber 45 is expanded into sealing engagement with the wall of the pipe line 10, the sealing ring 57 functions to prevent leakage between the rubber 45 and the ring 47.

Figures 1, 10:
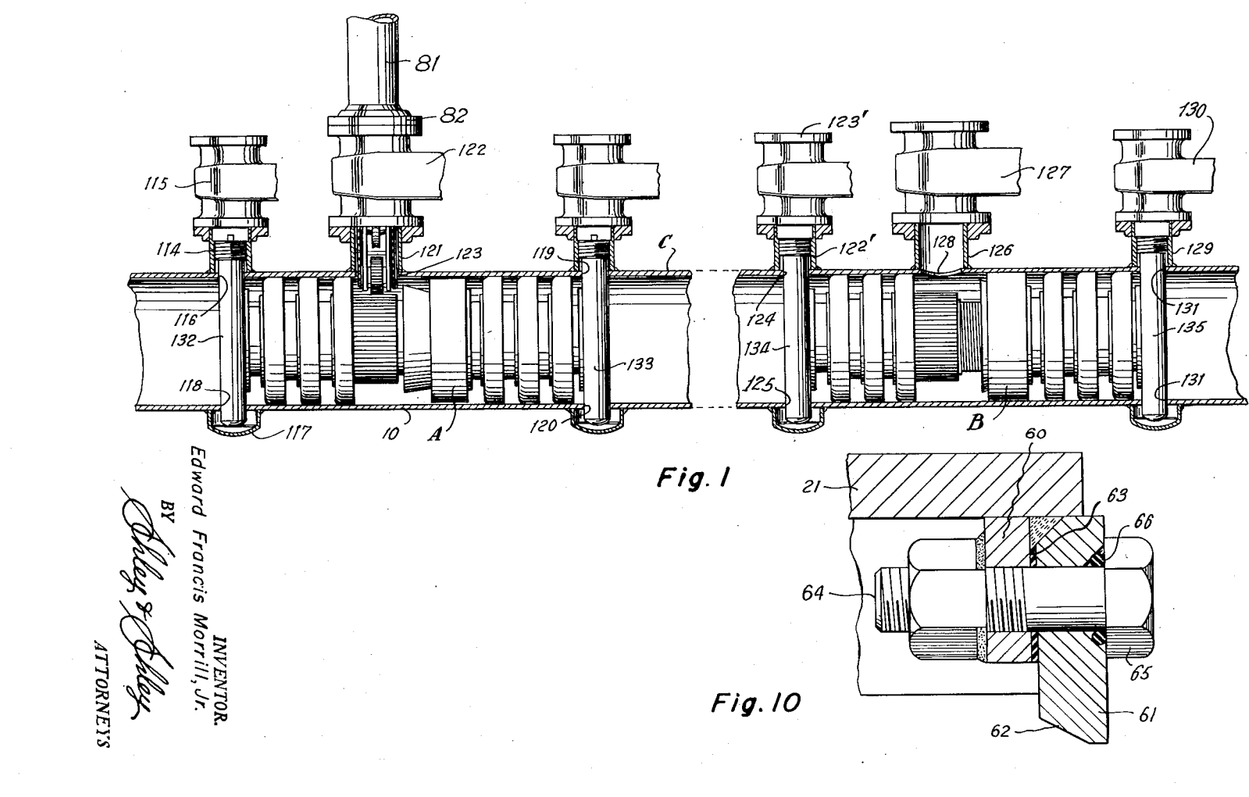
Fig. 1 is a longitudinal, sectional view of a section of pipe line, portions of the structures being shown in elevation, the view illustrating a method and means constructed and carried out in accordance with this invention for sealing off and isolating a section of pipe line for repair or alteration.
Fig. 10 is an enlarged, fragmentary view of the valve seat mounting.

The rearward end of the mandrel 21 projects to approximately the medial portion of the rearward cup section 50 and is received at that point within an internal annular flange 59 carried by the cup section and centering the rearward extremity of the mandrel therewithin. An internal annular flange 60 is welded in the rearward end of the mandrel and has bolted thereto a valve seat ring 61 having a central, rearwardly tapering valve seat 62. A sealing gasket 63 is confined between the flange 60 and the ring 61 by the bolts 64, the heads 65 of which engage O-ring seals 66 carried in chamfers formed around the bolt openings in the ring 61. Thus, any possibility of liquid leakage into the bore of the mandrel except through the valve seat 62 is precluded.

The mandrel carries a plurality of internal, longitudinally extending, shouldered ribs 68 in its rearward portion, the ribs extending forwardly from the flange 60 and terminating beneath the rearward portion of the expander drum 43 in rearwardly facing shoulders 69. A flanged sleeve 70 is received upon the shoulders 69 and surrounds the forward end of a cylindrical valve member 71. The rearward face of the valve 71 is flanged and carries a beveled, resilient valve seat engaging element 72 constantly urged against the valve seat 62 by a coiled spring 73 confined between the flange of the valve member and the flange of the sleeve 70. Thus, at all times, the spring 73 urges the valve element 72 into a closed position.

For locking the valve in a closed position, dogs or bell crank levers 74 are pivotally mounted upon the rearward ends of the ribs 68 and carry rollers 75 projecting through windows 76 in the mandrel 21 into the path of the rearwardly moving sleeve 34. Upon rearward movement of the sleeve 34, the rollers 75 are engaged and forced inwardly through the windows 76 into the interior of the mandrel 21, thus swinging pressure rollers 77 against the bottom of the valve member 71 and locking the valve in a closed position. To provide for small inaccuracies of manufacture, the bottom of the valve element 71 is made slightly resilient in nature by a resilient disc 78 clamped thereto by a bumper plate 79 which is engaged by the pressure rollers 77. With this structure, a slight over travel of the pressure rollers 77 is permitted since the disc 78 will yield under the excessive pressure and will permit the bumper plate 79 to move closer to the bottom of the valve element 71. To limit the rearward travel of the sleeve 34, the mandrel 21 is provided with an external shoulder 80 rearwardly of the windows 76 and against which the rearward edge of the sleeve will abut to limit rearward movement thereof.

There is shown in Figs. 4 through 7 a structure for engaging the gear 38 of the plug and selectively expanding or contracting the plug. The plug operating mechanism includes a tubular housing 81 carrying a pipe flange 82 at one end and a transverse head 83 at its opposite end. There is also an internal transverse partition 84 spaced from the flange end of the housing.

Figure 4:
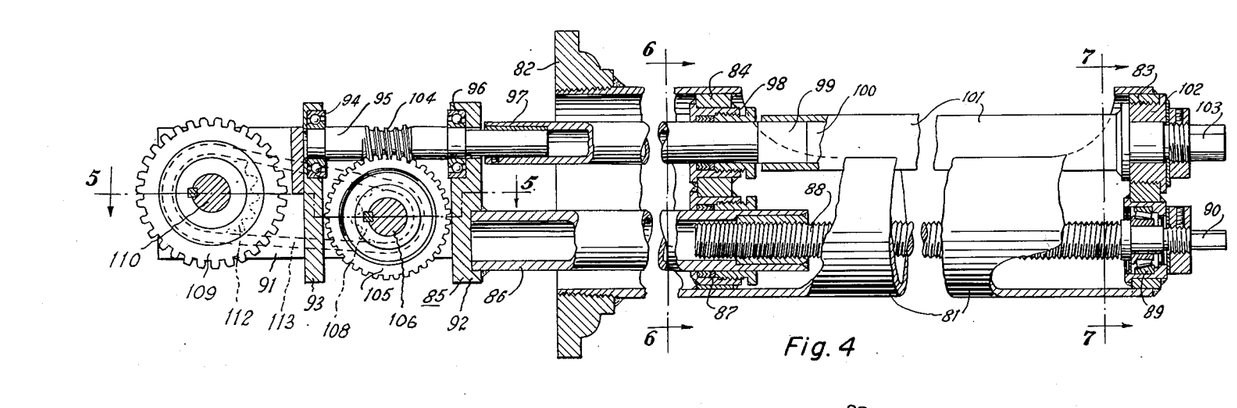
Fig. 4 is a longitudinal view, partly in elevation and partly in section, of the plug expanding means.
Figure 5:
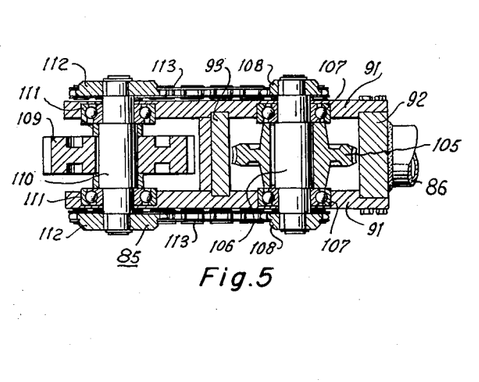
Figs. 5, 6, and 7, are sectional views taken upon the respective lines of Fig. 4.
Figure 6:
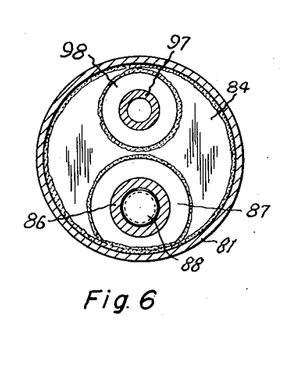
Figure 7:
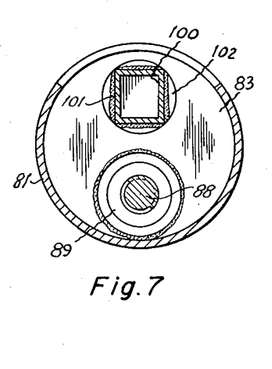

A gear carriage 85 projects from the housing and is carried upon a tubular support member 86 passing through a packing gland 87 in the partition 84. A jack screw 88 is screwthreadedly received within the member 86 and has its outer end carried in a thrust bearing 89 mounted in the head 83. A wrench head 90 upon the outer extremity of the jack screw projects outwardly of the head 83 and makes provision for selective rotation of the jack screw to advance or retract the tubular support member 86 through the partition 84 to extend the gear carriage from the housing 81, or to retract this gear structure into the housing 81 between the flange 82 and the partition 84.

The gear carriage 85 includes a pair of spaced parallel cheek plates 91 joined at one end by a transverse head 92 to which the support member 86 is secured. A transverse web 93 spaces the medial portions of the cheek plates and carries in an end bearing 94 the lower end of an operating shaft 95. The shaft 95 also passes through a bearing 96 in the head 92 and is keyed to a tubular extension 97 projecting into the housing 81 through a packing gland 98 in the partition 84 similar to the gland 87. The outer end 99 of the tube 97 is polygonal in cross-section and telescopes the polygonal bore 100 of a driving tube 101. The outer end of the driving tube is carried within a bearing member 102 supported in the head 83, and a wrench head 103 projects beyond the bearing for engagement by a suitable tool and rotation of the tubes 101 and 97.

The shaft 95, which is revolved by means of the tubes 97 and 101, has a worm gear 104 formed thereon intermediate the bearings 94 and 96, and engages a worm wheel 105 positioned between the cheek plates 91 upon a shaft 106 journaled in the cheek plates on bearings 107 and projecting outwardly beyond said plates. A chain sprocket 108 is mounted upon each end of the shaft 106 outwardly of the plates 91.

A gear 109, adapted to engage the gear 38, is mounted upon a shaft 110 outwardly of the web 93 between the cheek plates 91 and projects beyond the ends of said plates. The shaft 110 is carried upon bearings 111 suitably recessed in the cheek plates and has chain sprockets 112 upon each end outwardly of the cheek plates. Suitable driving sprocket chains 113 lie along the outer face of each of the plates 91 and encircle the sprockets 108 and 110. Thus, as the worm wheel 105 is driven by the worm gear 104, the sprocket chains 113 are driven to cause revolution of the gear 109 and the transmission of rotative power to the gear 38.

The telescopic mounting of the polygonal head 99 of the driving tube 97 permits the inward and outward movement of the tube 97 within the tube 101 without the loss of means for transferring rotative motion from the wrench head 103 to the gear 109. Operation of the jack screw 88 by the wrench head 90 results in the extension or retraction of the gear structure 85.

In the utilization of the method of this invention, and the structures disclosed herein, one or more of the plugging devices are introduced into the pipe line in the manner described in Figs. 8 and 9 and pumped to the location in the pipe line at which a closure is desired. Assuming that it is desired to isolate a short section of the pipe line, the pipe line will have been drilled into at the proper location without loss of pressure by means of drilling machines such as that shown in the patent to Field, No. 1,743,338. In accordance with this standard and well known practice, and referring to Fig. 1, a short flanged nipple 114 is welded to the outer wall of the pipe line 10, and a fully opening valve such as a gate valve 115 is secured thereto. With the valve 115 closed, a pipe tapping or tap drilling device is secured to the opposite side of the valve 115 in pressure-tight relationship, the valve is then opened and the pipe tapping drill advanced through the valve so as to cut a hole 116 in the wall of the pipe within the nipple 114. Desirably, a blind or bull plug 117 will have been welded to the pipe diametrically opposite the nipple 114, and the drilling device may be advanced entirely across the pipe to drill an opening 118 in the wall thereof diametrically opposite the opening 116.

The drilling device is then retracted, and the valve 115 is closed, after which the drilling device may be disconnected without loss of pressure or fluid from the pipe line.

This same operation is carried out at a point spaced sufficiently from the openings 116 and 118 to introduce into the pipe line additional lateral openings 119 and 120 spaced from the openings 116 and 118 a distance approximately equal to the length of the plugging device. Also, at a point between the openings 116 and 119 proper to bring the same into alignment with the gear 38 when the plug is in position, an additional nipple 121 and valve 122 is connected to the pipe, and an opening 123 drilled through the wall of the pipe for reception of the actuating device shown in Fig. 4.

The same operation is carried out on the pipe line at the point at which the second closure or seal is desired, there being thus secured to the pipe the nipple 122′ carrying the valve 123′ and permitting access to diametrically opposed openings 124 and 125, the nipple 126 carrying the valve 127 for access to the opening 128 through which the actuating device may be inserted, and the nipple 129 carrying the valve 130 and permitting access to the openings 131.

Before the first plugging device A reaches the area to be sealed off, a blocking bar 132, by means of a pressure-tight housing, is lowered through the valve 115 into the openings 116 and 118 so as to provide a transverse barrier in the pipe line 10 without obstructing materially the passage of liquid therethrough. The valve 115 is then closed and the bar introducing housing, which may be quite similar in structure to the drill advancing means of the Field patent, is disconnected.

As the plugging device A reaches the blocking bar, the forward striker plate 33 of the plugging device engages the bar 132 and further movement of the device is prevented. Since the valve element 72 of the plugging device is not yet in its locked position, however, fluid may continue to pass through the plugging device and through the pipe line due to its forced compression of the spring 73 and the unseating of the element 72 from the seat 62.

Following the positioning of the first plugging device A, a second blocking bar 133 is dropped into position through the openings 119 and 120 to prevent rearward movement of the plugging device A when the pipe line is opened. Also, a blocking bar 134 is dropped into the openings 124 and 125 for reception for the second plugging device B which is then pumped through the pipe line and into position against the bar 134. A fourth blocking bar 135, placed in position in the openings 131, likewise prevents reverse travel of the second plugging device B.

With both plugging devices in place, the pumping of fluid through the pipe line may be terminated, and both plugging devices expanded or set in position to isolate the section of pipe line therebetween. Up until this point, neither of the plugging devices or their blocking bars have materially impeded the flow of liquid through the pipe line and substantially normal pumping operations, or at least pumping operations adequate to move the plugging devices into place, may be continued. Referring now to Fig. 4, the plug actuating device illustrated therein, with its gear mechanism 85 retracted into the housing 81 between the flange 82 and the partition 84, is joined onto the outer flange of the valve 122 by the flange 82 of the actuating device, the valve 122 is opened, and the gear mechanism advanced into engagement with the gear 38 of the plug A for the transmission of rotating torque thereto.

As the gear 38 is revolved around the mandrel 21 of the plugging device, the threaded collar 35′ causes the sleeve 34 to advance toward the rearward end of the plugging device and force the tapered or conical expander drum 43 into the tapered bore 44 of the sealing rubber 45. The bolts 35 prevent rotation of the sleeve 34 with the collar 35′, the frictional engagement of the cups 27 and 52 with the inner wall of the pipe line being adequate to hold the mandrel 21 itself against revolution within the pipe line. Thus, the plugging device A is expanded into its sealing position, as illustrated in Fig. 3, the sealing rubber 45 being tightly and snugly distorted between the inner wall of the pipe 10 and the outer conical surface of the expander drum 43 to provide a complete seal. The gaskets 55 and 63, along with the O-ring 66 and the sealing ring 58, prevent any bypassing of the sealing rubber and insure a complete seal.

At the same time that the expander drum is advanced into the sealing rubber, the rearward end of the sleeve 34 is caused to ride over the rollers 75, thus forcing the rollers inwardly through the window 76, swinging the bell crank levers 74, and forcing the rollers 77 against the plate 79. This operation locks the valve element 72 securely against its seat 62 and completes the transverse closure of the pipe line.

The same operation is carried out with the plugging device B by retraction of the actuating device of Fig. 4, disconnection thereof from the valve 122 and connection to the valve 127. A suitable tap may then be made into the section C of the pipe line enclosed between the plugging devices A and B, the fluid drained therefrom and conserved, the pipe line repaired, modified, or otherwise altered as desired.

Following completion of the repairs or modifications, the plugs are removed by reversal of the above process, the actuating device being extended into the pipe line to engage the gear 109 with the gears 38, the gear 109 revolved in the opposite direction to withdraw the expander drum 43 from beneath the packing rubbers 45 and release or contract the plugging devices A and B from their sealing positions. Then, the blocking bar 132 may be removed and the plug A pumped down the pipe line for removal therefrom in the receiving trap 12'. The plug B, having been released and its internal valve having been unlocked, will permit the passage of fluid for this operation, but the plug B is prevented from downstream movement because of the blocking bar 134 which is still in place.

After retrieving the plug A from the pipe line, the blocking bars 133, 134, 135 may be removed and the plug B transported down the pipe line to the receiving trap 12' for removal. All of the valves 115, 122, 123', 127 and 130 may be closed and left in place, or the nipples 114, 121, and so forth may carry internal screw threads into which a solid plug may be screwed, followed by removal of the valves and the securing of a blind flange or other inexpensive closure element to the outer ends of the nipples.

It is pointed out that the valves required for the side tapping operation of the pipe line are relatively small and inexpensive as compared to the valves required for the pipe line itself, and whether or not such smaller valves are salvaged, a material saving is effected. For reasons of illustration, the drawings do not show the pipe line and the side taps thereinto in exact proportion since this method and these structures are usable upon pipe lines of any diameter.

It is to be noted that the method and means may be employed on pipelines handling any type of fluid, such as natural gas, even though they find their greatest effectiveness and economy in use on lines handling liquid materials. It is further to be noted that the plugs may be modified for use in different diameter pipes by a simple changing of the rubber 45 and the cups 27 and 51, accompanied by replacement of the ring 47 by one of larger diameter and possibly the removable attachment of a flange ring to the forward end of the cone 43.

The foregoing description of the invention is explanatory thereof and various changes in the size, shape and materials, as well as in the details of the illustrated construction and the described method may be made, within the scope of the appended claims, without departing from the spirit of the invention.

What I claim and desire to secure by Letters Patent is:

1. A pipe line plug including, a central support, pipe engaging cups on the support, a packing member on the support, means movable longitudinally of the packing member for expanding the same radially, said means having a screw-threaded portion, an actuating collar having screw-threaded engagement with the expanding means for moving the latter longitudinally of the packing member, and external gear teeth on the collar exposed laterally of the plug whereby said gear teeth may be engaged by means for revolving the actuating collar introduced laterally of the plug.

2. A pipe line plug including, a central support, pipe engaging cups on the support, a packing member on the support, a cone movable longitudinally of the packing member for expanding the same radially, said cone having a screw-threaded portion, and an actuating collar having screw-threaded engagement with the expanding cone for moving the latter longitudinally of the packing member, and external gear teeth on the collar exposed laterally of the plug whereby said gear teeth may be engaged by means for revolving the actuating collar introduced laterally of the plug.

3. A pipe line plug as set forth in claim 1, wherein the central support has an axial passage, and a pressure relief valve normally closing said passage.

4. A pipe line plug as set forth in claim 3, resilient means urging said valve toward a closed position, locking means movably mounted in the plug for locking the valve closed, and actuating means for the locking means engaged by the expanding means and disposed in the path of longitudinal movement of the expanding means.

5. A pipe line plug as set forth in claim 1, and a removable actuating device for the plug adapted to be inserted through the wall of a pipe, the device including, a gear wheel adapted to engage and revolve the actuating collar, means for revolving the gear wheel, a telescoping bar supporting the gear wheel, and means for telescoping the bar to retract the gear wheel.

6. A pipe line plug as set forth in claim 1, and a removable actuating device for the plug adapted to be inserted through a closure into a pipe, the device including, a housing adapted to be connected to the closure in pressure-tight relationship, a partition in the housing, a supporting bar extending through the partition, an operating shaft extending through the partition, pressure seals on the partition around the bar and the shaft, means for moving the bar through the partition, a gear wheel carried by the bar and adapted to engage and revolve the actuating collar, and means connected to the shaft for revolving the gear wheel.

7. A pipe line plug including, a central support, pipe engaging cups on the support, an expansion cone movable longitudinally on the support, means holding the cone against revolving on the support, an annular packing member having a tapered bore receiving the cone, an actuating collar having screw-threaded engagement with the cone for moving the latter longitudinally, means limiting longitudinal movement of the collar and the packing member, and means for revolving the collar.

8. A pipe line plug as set forth in claim 7 wherein the pipe engaging cups are disposed at each end of the support, and the actuating collar and packing member are confined therebetween so as to be protected thereby.

9. A pipe line plug as set forth in claim 8, wherein the outside diameters of the actuating collar and the packing member are less than the diameter of the cups.

10. A pipe line plug including, a central support, pipe engaging cups on the support and held against rotation thereon, an expansion cone movable longitudinally on the support, means holding the cone against revolving on the support, an annular packing member having a tapered bore receiving the cone, an actuating collar having screw-threaded engagement with the cone for moving the latter longitudinally, means limiting longitudinal movement of the collar and the packing member, and means for revolving the collar.

11. As a sub-combination, an actuating device for a pipe line plug, said device including, an open-ended housing, a partition in the housing, a supporting bar and an operating shaft extending through the partition, pressure seals on the partition around the bar and shaft, a plug-engaging fitting on the bar in the open end of the housing, means carried by the shaft for powering said fitting, and means in the bar for projecting the fitting from the open end of the housing.

12. As a sub-combination, an actuating device for a pipe line plug having a circumferentially-rotatable member, said device including, an open-ended housing, a partition in the housing, a supporting bar and an operating shaft extending through the partition, pressure seals on the partition around the bar and shaft, a rotatable plug-engaging fitting on the bar in the open end of the housing, means carried by the shaft for rotating said fitting, and means for extending the bar to project the fitting from the open end of the housing.

13. A pipe line plug as set forth in claim 7, wherein the central support has an axial passage, a valve seat in the passage, a valve element adapted to engage the seat, and resilient means urging the valve element toward the seat, the valve element opening from the seat in such direction as to receive excessive pressure from the cups.

14. A pipe line plug as set forth in claim 7, wherein the central support has an axial passage, a valve seat in the passage, a valve element adapted to engage the seat, and resilient means urging the valve element toward the seat, dogs pivotally mounted on the support and pivotally movable into engagement with the valve element to lock the valve element on the seat, and means carried by the dogs engaged by the cone in the longitudinal movement of the cone for pivotally moving the dogs into engagement with the valve element.

15. A pipe line plug as set forth in claim 7, wherein the central support has an axial passage, a valve seat in the passage, a valve element adapted to engage the seat, and means constantly urging the valve element toward the seat, bell crank levers pivoted in the passage of the support, the support having openings through which one arm of each of the levers projects into the path of movement of the cone, the other arm of each lever underlying the valve element for engagement with the valve element to lock the same on the seat when the cone moves longitudinally over the openings.

16. The method of closing off a large diameter pipe line at a selected point including the steps of, cutting a small diameter opening in the wall of the pipe at the selected point, introducing a plug stopping element into the pipe through the opening, introducing an expansible pipe plug into the pipe at a point removed from the selected point of closure, transporting the plug through the pipe to the stopping element by flowing fluid through the pipe, and expanding the plug at the selected point of closure into sealing engagement with the wall of the pipe.

17. The method of closing off a section of a large diameter pipe line including the steps of, introducing a first plug stopping element into the pipe line at the downstream end of the pipe line section, flowing a first expansible plug through the pipe line in a body of fluid to the first stopping element, introducing a second plug stopping element into the pipe line at the upstream end of the pipe line section, flowing a second expansible plug through the pipe line in a body of fluid to the second stopping element, and expanding both plugs to seal off the section of pipe line.

References Cited in the file of this patent
UNITED STATES PATENTS

| | | |
|---|---|---|
| 2,500,601 | Butler | Mar. 14, 1950 |
| 2,517,626 | Berg | Aug. 8, 1950 |
| 2,601,614 | Johnson | June 24, 1952 |